June 28, 1955     L. W. GLANZ     2,711,628
DEVICE FOR DETACHING AND CONNECTING CHAIN LINKS
Filed May 1, 1953
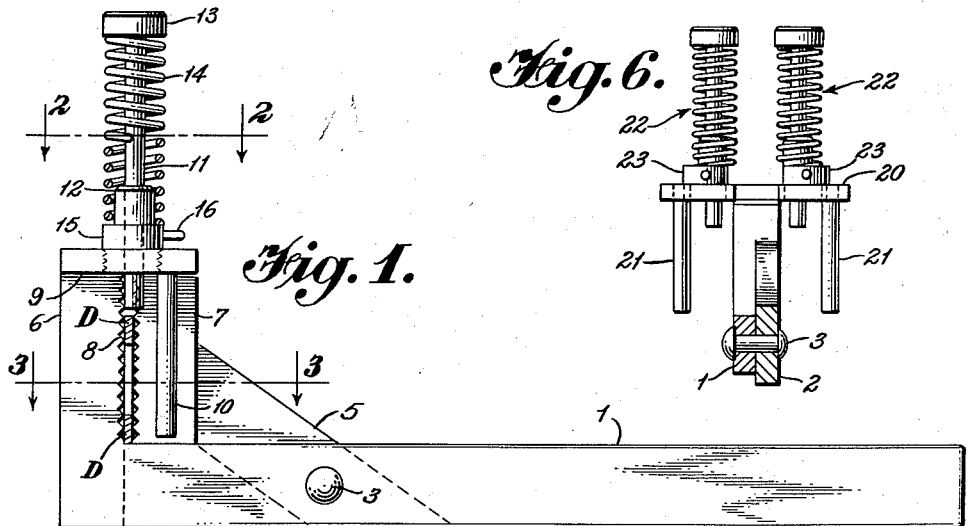
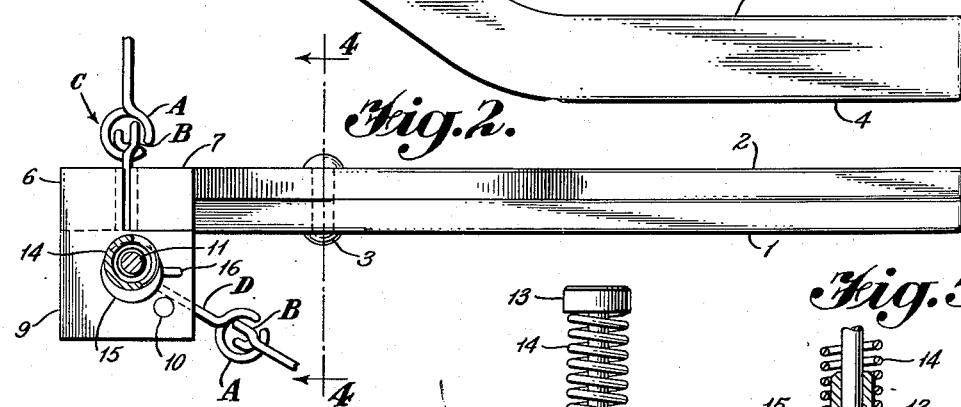
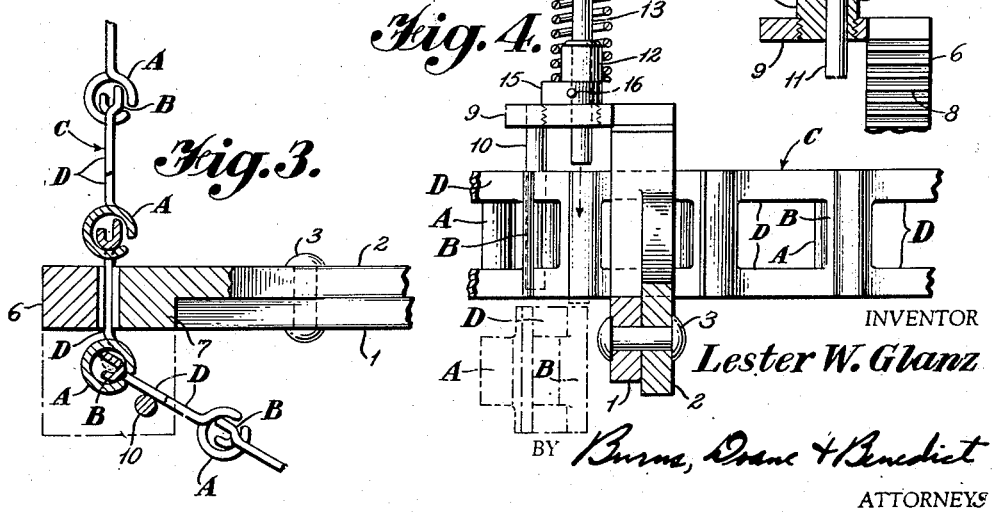
INVENTOR
*Lester W. Glanz*
BY *Burns, Doane & Benedict*
ATTORNEYS United States Patent Office 2,711,628
Patented June 28, 1955

2,711,628

DEVICE FOR DETACHING AND CONNECTING CHAIN LINKS

Lester W. Glanz, Liberty Center, Ohio

Application May 1, 1953, Serial No. 352,439

4 Claims. (Cl. 59—7)

This invention relates generally to a tool for use in making repairs to chains of the type having links with interfitting terminal sleeves and pintle pins forming a pivotal rolling connection between the links. More specifically this invention relates to a tool for disconnecting and replacing chain links by gripping a chain link while the adjacent link is forcibly disengaged therefrom.

The tool has particular use in connection with that type of chain commonly found in farm machinery which comprises a plurality of links stamped from a strip of sheet metal with means at the ends of the links for pivotally connecting adjacent links. This means is so constructed by bending the sheet metal at the ends of each link that the links may be connected together at their ends or separated therefrom by positioning adjacent links at a predetermined angle and displacing the links transversely of each other.

Heretofore considerable difficulty has been experienced in separating the links of such chains for the purpose of making repairs and adjustments thereto. No inexpensive and adequate means has, until this invention, been devised for properly supporting one of the chain links while the other is being separated from it by laterally shifting the same.

Accordingly, it is a principal object of this invention to provide a simple and inexpensive tool having means for gripping a link in the chain and means for driving the adjacent link to be disconnected therefrom by moving it laterally out of engagement with the gripped link.

It is a further object of this invention to provide a chain tool which may be used for disengaging the links or reconnecting the links of chains of the type described which is adaptable to be used with a variety of sizes of such chains.

It is another object of this invention to provide a small compact chain tool which can be readily handled in repairing chains of the type described above where the space for working with such a tool is limited.

With the foregoing and other objects in view, which will appear as the description proceeds, the invention resides in the combination and arrangement of parts and in the details of construction hereinafter described and claimed, it being understood that changes in the precise embodiment of the invention herein disclosed may be made within the scope of the appended claims without departing from the spirit of the invention.

Referring to the drawings:

Figure 1 is a side elevation of a preferred embodiment of the chain tool of this invention.

Figure 2 is a plan view partially in section taken on line 2—2 of Figure 1.

Figure 3 is a detailed sectional view taken on line 3—3 of Figure 1.

Figure 4 is a sectional view taken on line 4—4 of Figure 2 showing a portion of a chain in operative position within the chain tool.

Figure 5 is a detailed sectional view showing the construction for mounting the driving pin to enable the chain tool to be used with a variety of chain sizes.

Figure 6 is a detailed sectional view similar to Figure 4 and showing a modified embodiment of the invention.

As stated above, the chain tool of this invention is specifically constructed to permit disassembly and repair of a certain type of chain which is extensively used on farm equipment. On the drawing in Figures 2, 3 and 4, a section of the particular type of chain is illustrated at C associated with the chain tool of this invention. Each of the links of this type of chain has a slotted sleeve A at one end and a pintle pin B at the opposite end. These two portions of the link are joined by side bars D which complete the link of the chain.

In the assembly of a plurality of such links to produce a length of chain, the pintle pin B of one link is received within the slotted sleeve A of the adjacent link. To accomplish this assembly, the links to be connected must be positioned at the proper angle so that side bars D can slide through the slot in sleeve A. When the two links have been moved together in such a manner that they are in alignment with each other, the slotted sleeve A, being of such a length as to fit between the parallel side bars D, can be pivoted to keep the two links in connected relation.

Thus in assembling and disassembling this type of chain, it is necessary that the links be maintained at the necessary angle so that the side bar D can slide through the slot of the sleeve A. Since it is not desirable that the links of such a chain be readily disconnectable while in use, the slot in sleeve A is generally made of such a size as to require a forcing of the adjacent link to push the side bar D through the slot in this sleeve. In view of this, should the links while in use become positioned at the angle which would allow their disconnection, such disconnection would not take place, since the side bar D cannot freely slide through the slot in sleeve A.

By reason of this characteristic of the chain, a tool for disconnecting the links for replacing links or repairing the chain must be able to firmly grip the chain while the adjacent link is being forcibly driven therefrom. Further, such a tool must maintain the adjacent links at the required angle so that the side bar D can be driven through the slot in the sleeve A of the adjacent link. Since in many cases the chain is applied on the machine in a cramped or crowded location, it is a prerequisite of a tool to be used in repairing such a chain that it be of a small enough size to enable it to grip the chain without interfering with closely adjacent parts of the machine on which the chain is positioned.

Referring to Figure 1, the chain tool has a pair of levers 1 and 2 pivotally connected by a pin 3 such as a rivet or other suitable connecting means. The lever 1 is straight, whereas the lever 2 has a straight handle portion 4 and a second angled portion 5 which crosses the straight lever 1 at the pin 3. The parallel portions of levers 1 and 2 provide an area which may be grasped by the user of the tool to urge the two levers toward each other while gripping a chain link for disassembly from its adjacent link.

The outer ends of the levers 1 and 2 have a pair of parallel jaws 6 and 7, respectively, secured thereto. These jaws may be provided with serrations 8 on the opposed faces thereof to assist in gripping a link of the chain during the operation to be performed on such chain. It will readily be seen from the drawing that urging the straight parallel portions of levers 1 and 2 toward each other will cause the jaws 6 and 7 to be moved together. Thus, after a chain link has been positioned between these jaws, the user may apply force urging the levers together to insure that the link is firmly gripped between the serrated portions 8 of the jaws 6 and 7.

At the upper end of the jaw 6 a supporting plate 9 is provided, suitably secured thereto as by welding. This plate 9 has rigidly mounted therein a positioning pin 10 which extends downwardly from the underside of the plate 9 parallel to the jaws 6 and 7. The pin is positioned with reference to the jaws 6 and 7 so that when a link is gripped between such jaws and the side bars D of the next adjacent link are in contact with pin 10, the two links will be at the proper angle for disengagement or connection of their respective slotted sleeve and pintle pin.

The plate 9 also slidably supports a driving pin 11 in a bushing member 12. The axis of driving pin 11 also is parallel to the jaws 6 and 7 and spaced therefrom so that when moved down through plate 9 is will engage the pintle pin of the link adjacent to the link being held between the jaws 6 and 7. The operation of this driving pin will be explained in detail hereinafter.

The driving pin 11 has an enlarged head 13 adapted to be struck by a hammer or other driving instrument in using the tool to disengage or connect links of the chain. A spring 14 surrounds the driving pin 11 and is secured to the underside of the head 13 at one end and the other end thereof is secured to the bushing member 12. This spring serves to retain the driving pin 11 in its retracted position and by reason of the ends of the spring being secured to the head 13 and bushing 12, prevents the driving pin from being withdrawn from the bushing.

The operation of the tool of this invention in disconnecting the adjacent links of a chain is as follows: The side bars D of one link are gripped between the serrated parallel jaws 6 and 7 with one of the side bars resting on the edge of lever 1. Force is applied to hold this link by urging the parallel portions of the levers 1 and 2 toward each other. The link held between the jaws is positioned with its slotted sleeve A located beneath the lower end of the driving pin 11 so that the driving pin may move down through this slotted sleeve in driving apart the adjacent links of the chain.

The side bars D of the link adjacent to that gripped by the jaws 6 and 7 are moved so as to be in contact with the positioning pin 10. This action insures that the two links will be at the proper angle to enable the side bar D of one link to be driven through the slotted sleeve A of the adjacent link held between jaws 6 and 7.

After the chain has been so positioned, the application of repeated blows or other suitable force to the head 13 on driving pin 11 will result in the pin moving down and engaging the end of the pintle pin B of the link which is not held between jaws 6 and 7. Since the side bars D of this link are held at the proper angle with reference to the link between the jaws, these connecting bars may be forced through the slot in the sleeve A of the held link. This held link is firmly retained between jaws 6 and 7 with one side bar resting on the edge of lever 1. Continued downward movement of the driving pin 11 thereby forces the link from the slotted sleeve A of the link being held between jaws 6 and 7. When the pintle pin B has been completely disengaged from the slotted sleeve, the spring 14 will cause return of the driving pin 11 to its retracted position in readiness for the succeeding operation to be performed with the chain tool.

In utilizing the chain tool of this invention for reassembling a chain by reconnecting the links thereof, it is a simple matter to grip the side bars D of one link with the slotted sleeve A of that link axially aligned with the drive pin 11. The link to be connected is then positioned over the slotted sleeve A of the held link with the end of the pintle pin B of this free link beneath the end of the driving pin 11. As in the disconnecting operation, the positioning pin 10 will insure that the free link is maintained at the proper angle with respect to the link gripped between the jaws 6 and 7.

Repeated blows or other suitable force applied to the head 13 of driving pin 11 will then force the pintle pin B of the free link down into the slotted sleeve A of the held link with the side bar D of such free link sliding through the slotted sleeve A of the held link. When the pintle pin B has been forced into the slotted sleeve A so that the links are aligned, the reconnection operation is complete and the tool may be freed from its grip on the chain link. This leaves the links in their pivotally connected relation as will be readily understood.

The type of chain with which this tool is used is made in a variety of sizes. Thus the width of the chain link and length of the side bars D vary between the various-sized chains. To enable the chain tool of this invention to be used with any one of the various-sized chains, a particular adjustable feature is incorporated therein.

When a link of a chain is held between the jaws 6 and 7, the slotted sleeve A of a link having relatively long side bars D would naturally be further spaced from the jaws 6 and 7 than the slotted sleeve of a smaller link when held between the jaws. Accordingly, the bushing 12 which slidably retains the driving pin 11 is secured to the plate 9 by an enlarged base 15 threadably engaging this plate 9. The bore of bushing 12 which slidably receives the driving pin 11 is mounted eccentrically of the base 15 as shown in Figures 2, 4 and 5. The base portion 15 is provided with an actuating arm 16 so that this base and the bushing 12 mounted eccentrically thereon may be rotated through an angle of 180°.

As shown in Figures 2, 4 and 5, the driving pin 11 is positioned immediately adjacent to the jaws 6 and 7. However, upon moving the arm 16, the base 15 and bushing 12 may be rotated through 180° which, by reason of the eccentric location of the bushing 12, results in the axis of the driving pin 11 being moved further away from the jaws 6 and 7. Thus it will be seen that by this construction the axis of the driving pin 11 may be positioned as desired to insure that the pin will cooperate with the links to be disconnected or connected. The pintle pin of the adjacent link will be directly engaged by the driving pin 11 to move through the slotted sleeve of the link held by the jaws 6 and 7. Therefore, regardless of the size of chain to be worked on, the tool of this invention may be adjusted by proper positioning of the base 15 and bushing 12 mounted thereon to be usable with any size chain of the type for which the tool is designed.

Figure 6 of the drawing illustrates a modified form of the invention. This form of the invention is similar to that illustrated in Figures 1 through 5 with the addition of a second positioning pin and driving pin on the other side of the jaws of the chain tool.

A plate 20 is secured to the upper end of one of the jaws. This plate extends on both sides of the cooperating jaws of the tool. On each side of the levers 1 and 2 and jaws of this modified form, a positioning pin 21 and driving pin assembly 22 are located. Further, the driving pin assemblies 22 are mounted in the plate 20 by a suitable adjusting means 23 similar to that shown on the form of the invention of Figures 1 through 5.

In this modified form of chain tool, it is possible to grip the link of the chain with the slotted sleeve extending from either side of the gripping jaws. Regardless of the position of the slotted sleeve, a driving pin is available on either side of the jaws to drive out the pintle pin of the adjacent link. As in the embodiment shown in Figures 1 through 5, the positioning pins 21 insure that the free adjacent links will be located at the proper angle to permit their side bars D to be driven from the slotted sleeve of the link held between the jaws. Since the operation of the form of invention shown in Figure 6 is similar to the operation of the form described above, it is deemed unnecessary to repeat the operation of using this chain tool with regard to this modified form.

Having thus described my invention, what I claim is:

1. A device for detaching and connecting chain links of the type having a slotted sleeve at one end thereof and a pintle pin at the other end, said device comprising a pair of pivotally interconnected levers, each lever having a hand grip portion adjacent one end and a jaw carried by the opposite end, the jaws providing link gripping surfaces to engage the opposite faces of a chain link intermediate the slotted sleeve and pintle pin upon movement of said levers towards parallelism, a ledge adjacent one end of said jaws formed at the junction of one of said levers with its jaw to supportingly engage the edge of a chain link during a detaching or connecting operation, support means carried by one of said jaws at the end thereof opposite said ledge, a pintle driving pin slidably carried by said support means with the axis thereof parallel to the link gripping surfaces of said jaws in their closed position and having a driving head at one end thereof for forcing said pin downwardly into engagement with the end of the pintle of a chain link adjoining the chain link held by said jaws, and spring means engaged between said pin and said support means to normally bias said pin toward retracted position.

2. A device for detaching and connecting chain links as recited in claim 1 further comprising a link positioning member carried by one of said jaws and engageable with the chain link adjoining the link held by said jaws to maintain such adjoining links at the required angle so that the links may be moved transversely of each other for detaching or connecting the links.

3. A device for detaching and connecting chain links as recited in claim 1 further comprising a bushing rotatably mounted in said support means, said bushing having a bore extending eccentrically therethrough to slidably receive said driving pin, whereby partial rotation of said bushing will displace the axis of said driving pin with respect to the plane of said jaws to accommodate different sizes of chain links.

4. A device for detaching and connecting chain links as recited in claim 1 wherein said support means extends laterally of both sides of the plane of said jaws and a spring biased driving pin is slidably mounted on both sides of said jaws with the axis of each pin parallel to the link gripping surfaces of said jaws in their closed position.

References Cited in the file of this patent

UNITED STATES PATENTS

| | | |
|---|---|---|
| 1,670,648 | Beyer | May 22, 1928 |
| 1,696,578 | Lippert | Dec. 25, 1928 |
| 2,379,001 | Hage | June 26, 1945 |
| 2,467,279 | Yaupel | Apr. 12, 1949 |

FOREIGN PATENTS

| | | |
|---|---|---|
| 246,684 | Great Britain | Feb. 4, 1926 |